United States Patent
Clarkson

(10) Patent No.: US 9,644,493 B2
(45) Date of Patent: May 9, 2017

(54) FAN CASE BALLISTIC LINER AND METHOD OF MANUFACTURING SAME

(75) Inventor: Steven Clarkson, Cheshire, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1202 days.

(21) Appl. No.: 13/606,079

(22) Filed: Sep. 7, 2012

(65) Prior Publication Data

US 2014/0072421 A1    Mar. 13, 2014

(51) Int. Cl.
| | |
|---|---|
| F01D 25/24 | (2006.01) |
| F01D 21/04 | (2006.01) |
| F02K 1/82 | (2006.01) |
| F02C 7/045 | (2006.01) |
| F02C 7/057 | (2006.01) |
| B29C 53/56 | (2006.01) |
| B29C 63/34 | (2006.01) |

(52) U.S. Cl.
CPC ........... F01D 21/045 (2013.01); F01D 25/24 (2013.01); F02C 7/045 (2013.01); F02C 7/057 (2013.01); F02K 1/827 (2013.01); B29C 53/562 (2013.01); B29C 63/34 (2013.01)

(58) Field of Classification Search
CPC ............................. F01D 21/045; B29C 63/34
USPC ....................................................... 264/160
See application file for complete search history.

(56) References Cited

U.S. PATENT DOCUMENTS

| | | | |
|---|---|---|---|
| 6,382,905 B1 | 5/2002 | Czachor et al. | |
| 8,029,231 B2 | 10/2011 | Evans | |
| 8,092,164 B2 * | 1/2012 | Moon | F01D 25/24 415/200 |
| 8,206,102 B2 | 6/2012 | Moon | |
| 8,231,328 B2 | 7/2012 | Reed | |
| 9,017,814 B2 * | 4/2015 | Xie et al. | 428/411.1 |
| 2004/0146393 A1 | 7/2004 | Evans | |
| 2006/0024154 A1 | 2/2006 | Costa et al. | |
| 2006/0201135 A1 * | 9/2006 | Xie et al. | 60/226.1 |
| 2006/0237260 A1 * | 10/2006 | Costa et al. | 181/210 |
| 2009/0152764 A1 | 6/2009 | Xie et al. | |

(Continued)

FOREIGN PATENT DOCUMENTS

| | | |
|---|---|---|
| EP | 0922837 B1 | 10/2005 |
| EP | 1715158 | 10/2006 |

(Continued)

OTHER PUBLICATIONS

International Search Report and Written Opinion for International Application No. PCT/US2013/053893 completed on Nov. 6, 2013.

(Continued)

*Primary Examiner* — Gregory Anderson
*Assistant Examiner* — Jason Fountain
(74) *Attorney, Agent, or Firm* — Carlson, Gaskey & Olds, P.C.

(57) ABSTRACT

A method of manufacturing a fan case with a liner includes the steps of providing a preform having a circular cross-section with a cut and a first diameter, flexing the preform to reduce the first diameter to a second diameter, and adhering the preform to an inner surface of a fan case. A fan case for a gas turbine engine includes a fan case body having an inner surface. A preform is adhered to the inner surface and has a cut providing a gap.

14 Claims, 2 Drawing Sheets

(56) References Cited

U.S. PATENT DOCUMENTS

2011/0052383 A1* 3/2011 Lussier .................. 415/200
2011/0244150 A1 10/2011 Thrash
2012/0148392 A1 6/2012 Lussier et al.
2012/0207583 A1 8/2012 Voleti et al.

FOREIGN PATENT DOCUMENTS

GB 2273131 6/1994
WO 2010000990 1/2010

OTHER PUBLICATIONS

International Preliminary Report on Patentability for International Application No. PCT/US2013/053893 mailed Mar. 19, 2015.
U.S. Appl. No. 13/397,772, "Case With Ballistic Liner," filed Feb. 16, 2012.
U.S. Appl. No. 13/366,416, "Conformal Liner for Gas Turbine Engine Fan Section," filed Feb. 6, 2012.
U.S. Appl. No. 13/540,074, "Functionally Graded Composite Fan Containment Case," filed Jul. 2, 2012.
European Search Report for European Application No. 13835920.3 dated Oct. 28, 2015.

* cited by examiner

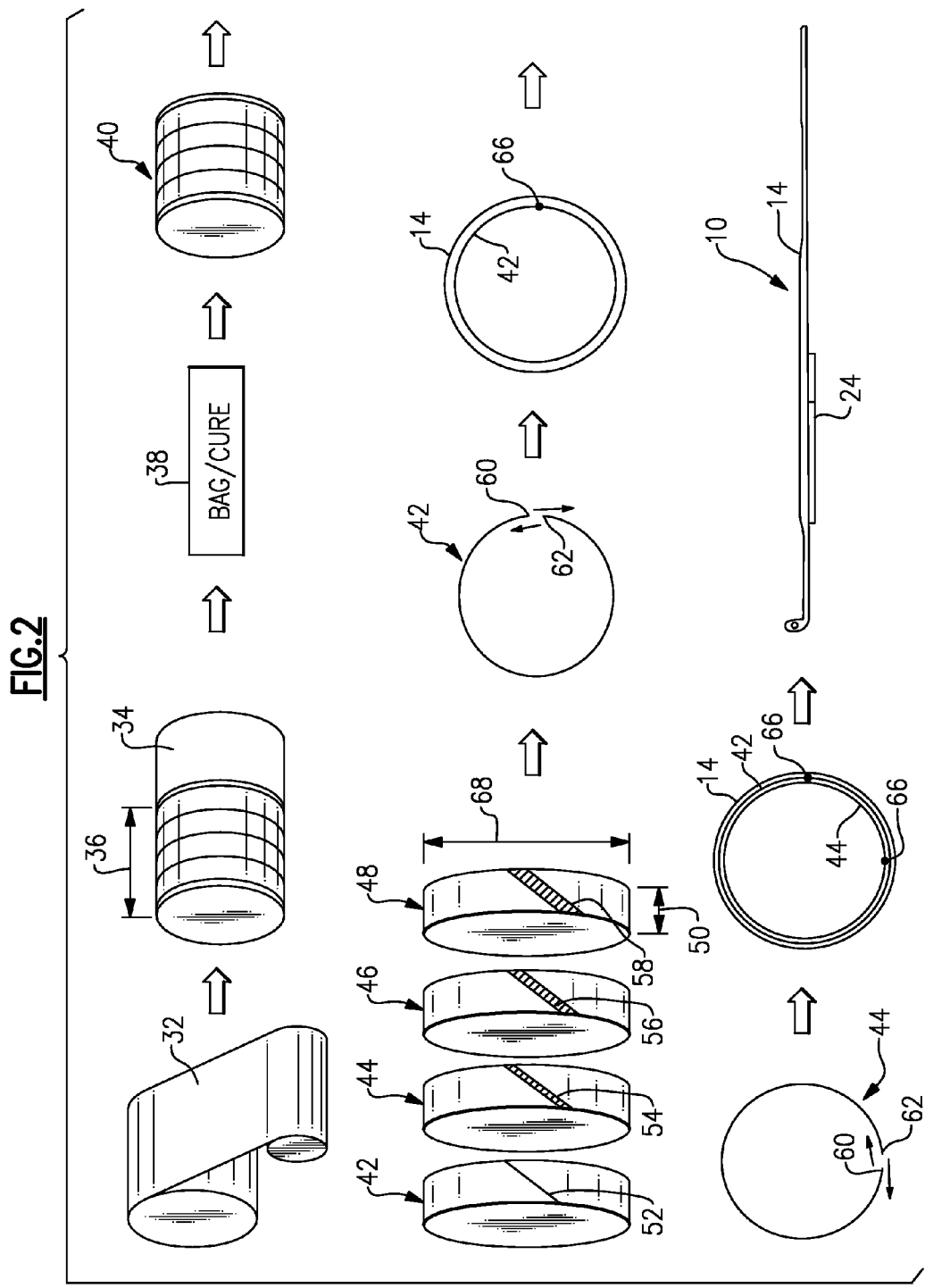

FAN CASE BALLISTIC LINER AND METHOD OF MANUFACTURING SAME

BACKGROUND

This disclosure relates to a fan case ballistic liner. The disclosure also relates to a method of manufacturing the fan case ballistic liner for a gas turbine engine.

A gas turbine engine may include a fan section containing fan blades that are surrounded by a fan case supported within a nacelle. One function of the fan case is to contain fractured and separated parts of the fan blades in a radial direction. Metallic fan cases can be undesirably heavy to perform this containment function. A composite fan case constructed of non-metallic materials can reduce weight and provide the same containment capability as a metallic fan case.

It is desirable to use a ballistic liner with the composite fan case to contain the fan blade in the event of a fan blade fracture. In one example, the ballistic liner includes multiple layers of KEVLAR. Each layer of KEVLAR is hand-laid by a worker in small pieces. A resin is applied to the fan case and a pliable KEVLAR mat or fabric is embedded into the adhesive. This process is very time and labor intensive.

SUMMARY

In one exemplary embodiment, a method of manufacturing a fan case with a liner includes the steps of providing a preform having a circular cross-section with a cut and a first diameter, flexing the preform to reduce the first diameter to a second diameter, and adhering the preform to an inner surface of a fan case.

In a further embodiment of any of the above, the providing step includes wrapping a reinforcing material about a mandrel to provide the preform with multiple layers.

In a further embodiment of any of the above, the providing step includes unrolling the reinforcing material onto the mandrel with adhesive embedded in the reinforcing material.

In a further embodiment of any of the above, the providing step includes vacuum-bagging and curing the preform to provide a rigid cylindrical structure.

In a further embodiment of any of the above, the providing step includes a preform having a length that is greater than a width of the liner.

In a further embodiment of any of the above, the providing step includes sectioning the preform to provide multiple preforms having the same first diameter. The multiple preforms have different size cuts.

In a further embodiment of any of the above, the providing step includes a preform having multiple plies.

In a further embodiment of any of the above, the providing step includes cutting the preform at an angle to provide a gap between adjacent edges.

In a further embodiment of any of the above, the flexing step includes moving edges toward one another.

In a further embodiment of any of the above, the adhering step includes adhering a first preform to the fan case.

In a further embodiment of any of the above, the adhering step includes adhering a second preform to the first preform.

In a further embodiment of any of the above, the second preform has a larger gap provided by the cut than the first preform.

In a further embodiment of any of the above, first and second cuts of the first and second preforms are circumferentially spaced relative to one another.

In a further embodiment of any of the above, the adhering step includes arranging a film adhesive onto the preform.

In a further embodiment of any of the above, the preform is constructed from a PPT, and the fan case is a composite material.

In one exemplary embodiment, a fan case for a gas turbine engine includes a fan case body having an inner surface. A preform is adhered to the inner surface and has a cut providing a gap.

In a further embodiment of any of the above, the preform is generally continuous and broken by a single axially extending cut.

In a further embodiment of any of the above, the fan case for a gas turbine engine includes multiple preforms. Each preform has a cut with the cuts circumferentially spaced relative to one another.

In a further embodiment of any of the above, the preform is constructed from a PPT, and the fan case is a composite material.

In a further embodiment of any of the above, the fan case for a gas turbine engine includes a honeycomb layer adhered to one of the preforms. An abrasive rub strip is adhered to the honeycomb. The honeycomb is arranged radially between the one of the preforms and the abrasive rub strip.

BRIEF DESCRIPTION OF THE DRAWINGS

The disclosure can be further understood by reference to the following detailed description when considered in connection with the accompanying drawings wherein:

FIG. 2 illustrates schematically a method of manufacturing the fan case of FIG. 1.

DETAILED DESCRIPTION

Figure 1:
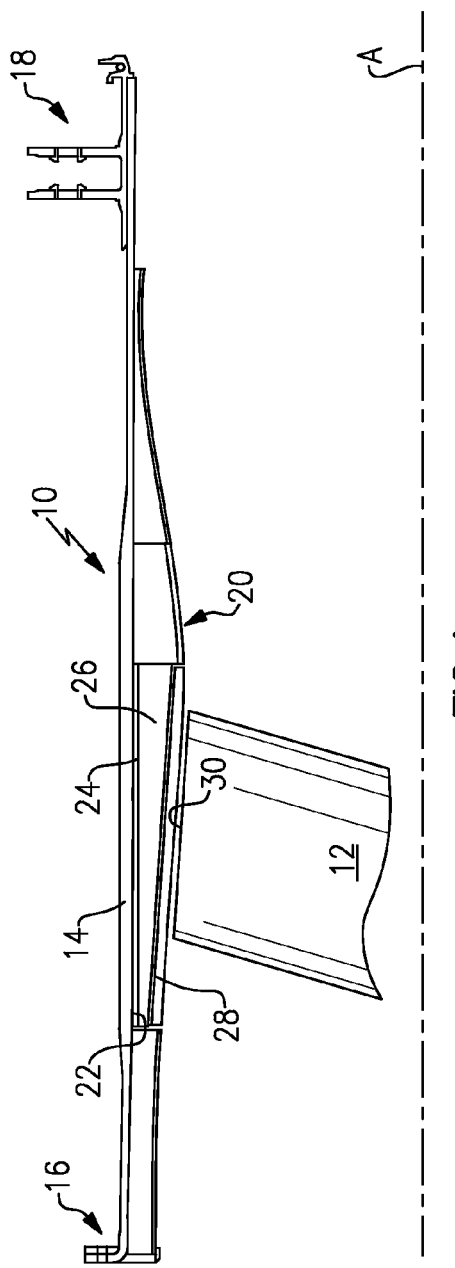
FIG. 1 is a cross-sectional view of a fan case and fan blade having a liner.

With reference to FIG. 1, the fan containment case 10 includes an inner structure 20, a ballistic liner 24, and the fan case body 14 defined about the axis A. Forward and aft attachments 16, 18 may be provided on the fan case body 14 to secure the fan case 10 to other structure. The inner structure 20 may include an abradable layer 28 and a honeycomb structure 26. The abradable layer 28 provides close tolerances to be maintained between the tips 30 of fan blades 12 and the inner structure 20. The honeycomb structure 26 provides acoustic dampening as well as the potential for retention of smaller blade fragments. It should be understood that the inner structure 20 is light weight and provides minimal, if any, resistance to blade fragment penetration.

In one example, the ballistic liner 24 is a cylindrical shell of a rigid material such as a resin impregnated, woven poly-paraphenylene terephthalamide (PPT) material, such as KEVLAR, KEVLAR XP™ for Hard Armor, LEXAN, metallic structures, or ceramic materials. That is, the ballistic liner 24 is hard and operates as a rigid impact liner on the radially inner surface of the fan case body 14, which may be manufactured of a composite material such as a carbon composite. The ballistic liner 24 need only extend a relatively short axial length as the hard ballistic liner 24 is radially located directly outboard of the fan blades 12.

Figure 4:
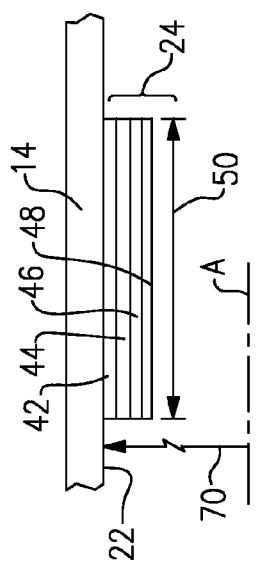
FIG. 4 is a cross-section of the fan case with the liner.

A method of manufacturing a fan case 10 with a liner 24 is schematically illustrated in FIG. 2. A roll of reinforcing material 32, such as PPT, is provided. The material 32 is rolled about a mandrel 34 providing a multilayer cylinder having an axial length 36. An adhesive resin is embedded in the material 32. The resin embedded material on the mandrel 34 is vacuum-bagged and cured, as schematically illustrated at 38, to provide a preform blank 40. In the example, the preform blank 40 includes multiple layers, in one example, five. The length of the preform blank 40 exceeds a width 50 of the liner 24 (see FIG. 4). The preform blank 40 is a rigid cylinder having an outer diameter 68 that is greater than an inner diameter 70 of the fan case body 14, as best shown in FIG. 4.

In the example, the preform blank 40 is sectioned to provide first, second, third and fourth rigid cylindrical preforms 42, 44, 46, 48 having a cylindrical cross-section. Each of the preforms 42-48 respectively include first, second, third and fourth cuts 52, 54, 56, 58. The cuts 52-58 (shown by hash lines) become progressively larger to enable an increasing amount of deflection radially inward during the assembly process, which is discussed in more detail below.

Figure 3:
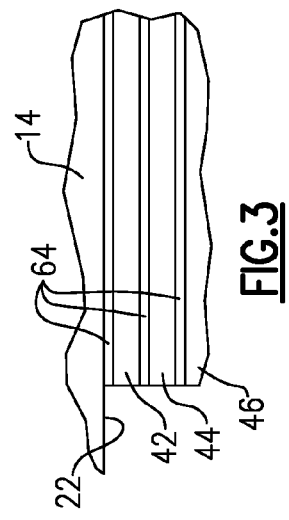
FIG. 3 is an enlarge view of multiple liner layers adhered to adjacent structure with an adhesive film.

The first preform 42 includes first and second edges 60, 62 that provide a gap at a first diameter. The first and second edges 60, 62 are moved toward one another to provide a second diameter and enable the first preform 42 to be inserted into an inner diameter 70 the fan case body 14. An adhesive 64, such as a film adhesive or more specifically an epoxy, is adhered to the inner surface 22 of the fan case body 14. The first preform 42 is adhered to the fan case body 14 by the film adhesive 64, best shown in FIG. 3. The adjacent first and second edges 60, 62 provide a joint 66 once installed into the fan case body 14. A slight gap may be provided between the first and second edges 60, 62 at the joint 66.

The second preform 44 is flexed to move the first and second edges 60, 62 toward one another to reduce the diameter of the second preform 44 and fit inside the first preform 42. A film adhesive 64 is applied to the first preform 42. The second preform 44 is inserted into the fan case body 14 and adhered to the first preform 42. The joint 66 of the second preform 44 is circumferentially offset relative to the first preform 42, for example, by 90°. Each subsequent preform is circumferentially offset relative to the prior preform to ensure that the joints 66 of the adjoining preforms are not aligned with one another, which eliminates weakened areas that may result from aligned joints. The cuts 52-58 are provided at an angle in the example and extend axially to provide a generally continuous preform. The angles of the cuts 52-58 may be oriented in an opposite direction as cuts of the adjacent preforms to further increase the strength.

In the example, the four preforms are nested to provide a twenty layer ballistic liner 24. Of course, a different number of layers and/or preforms may be used. Since each preform includes multiple layers having the desired shape, the fan case 10 may be assembled more quickly and inexpensively.

Although an example embodiment has been disclosed, a worker of ordinary skill in this art would recognize that certain modifications would come within the scope of the claims. For that reason, the following claims should be studied to determine their true scope and content.

What is claimed is:

1. A method of manufacturing a fan case with a liner, comprising the steps of:
   providing a preform having a circular cross-section with a cut and a first diameter, the cut providing a gap between adjacent edges;
   flexing the preform to reduce the first diameter to a second diameter by moving the edges toward one another; and
   adhering the preform to an inner surface of a fan case.

2. The method according to claim 1, wherein the providing step includes wrapping a reinforcing material about a mandrel to provide the preform with multiple layers.

3. The method according to claim 2, wherein the providing step includes unrolling the reinforcing material onto the mandrel with adhesive embedded in the reinforcing material.

4. The method according to claim 3, wherein the providing step includes vacuum-bagging and curing the preform to provide a rigid cylindrical structure.

5. The method according to claim 2, wherein the providing step includes a preform having a length that is greater than a width of the liner.

6. The method according to claim 5, wherein the providing step includes sectioning the preform to provide multiple preforms having the same first diameter, the multiple preforms having different size cuts.

7. The method according to claim 2, wherein the providing step includes a preform having multiple plies.

8. The method according to claim 1, wherein the providing step includes cutting the preform at an angle to provide the gap and the adjacent edges.

9. The method according to claim 1, wherein the preform is constructed from a PPT, and the fan case is a composite material.

10. The method according to claim 1, wherein the adhering step includes adhering a first preform to the fan case.

11. The method according to claim 10, wherein the adhering step includes adhering a second preform to the first preform.

12. The method according to claim 11, wherein the second preform has a larger gap provided by the cut than the first preform.

13. The method according to claim 12, wherein first and second cuts of the first and second preforms are circumferentially spaced relative to one another.

14. The method according to claim 11, wherein the adhering step includes arranging a film adhesive onto the preform.

* * * * *